United States Patent
Bog et al.

(10) Patent No.: US 9,559,482 B2
(45) Date of Patent: Jan. 31, 2017

(54) FULL POLYMER MICRORESONATORS

(71) Applicant: Karlsruher Institut für Technologie, Karlsruhe (DE)

(72) Inventors: Uwe Bog, Karlsruhe (DE); Sebastian Köber, Liechlingen (DE); Christian Koos, Siegelsbach (DE); Tobias Wienhold, Karlsruhe (DE); Sentayehu Wondimu, Karlsruhe (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 0 days.

(21) Appl. No.: 14/840,738

(22) Filed: Aug. 31, 2015

(65) Prior Publication Data
US 2016/0064889 A1 Mar. 3, 2016

(30) Foreign Application Priority Data
Sep. 2, 2014 (DE) .......... 10 2014 012 981

(51) Int. Cl.
| | | |
|---|---|---|
| *H01S 3/00* | (2006.01) | |
| *H01S 3/06* | (2006.01) | |
| *H01S 3/17* | (2006.01) | |
| *H01S 3/16* | (2006.01) | |

(52) U.S. Cl.
CPC .......... *H01S 3/0627* (2013.01); *H01S 3/0604* (2013.01); *H01S 3/178* (2013.01); *H01S 3/168* (2013.01)

(58) Field of Classification Search
CPC .............................. H01S 3/08; H01S 3/0627
USPC ......................................................... 359/346
See application file for complete search history.

(56) References Cited

U.S. PATENT DOCUMENTS

| | | | |
|---|---|---|---|
| 6,541,295 B1* | 4/2003 | Looney ................. | B82Y 20/00 438/29 |
| 7,236,664 B2 | 6/2007 | Martin et al. | |
| 7,769,071 B2 | 8/2010 | Vahala et al. | |
| 7,951,299 B2 | 5/2011 | Hossein-Zadeh et al. | |
| 8,179,935 B2* | 5/2012 | Santori ............. | G02B 6/12007 359/346 |
| 9,223,156 B2* | 12/2015 | Goldsmith ........... | G02F 1/0147 |
| 2003/0217804 A1* | 11/2003 | Guo ....................... | B82Y 10/00 156/230 |
| 2005/0111776 A1* | 5/2005 | Martin ............... | G02B 6/12007 385/14 |
| 2007/0269901 A1* | 11/2007 | Armani ............. | G01N 21/7746 436/172 |
| 2008/0008418 A1* | 1/2008 | Smith .................. | G01N 21/648 385/32 |

(Continued)

FOREIGN PATENT DOCUMENTS

| | | |
|---|---|---|
| DE | 11 2010 004 291 | 8/2010 |
| WO | 2011/054457 | 5/2011 |

OTHER PUBLICATIONS

He et al., "Whispering gallery microcavity lasers," Laser Photonics Rev., 2013, pp. 60-82, vol. 7, No. 1.

(Continued)

*Primary Examiner* — Mark Hellner
(74) *Attorney, Agent, or Firm* — McDonnell Boehnen Hulbert & Berghoff LLP

(57) ABSTRACT

The present invention relates to a microresonator, in particular a full polymer microresonator, a method for producing the microresonator, and the use of the microresonator as a microlaser and/or molecular sensor.

13 Claims, 3 Drawing Sheets

(56) References Cited

U.S. PATENT DOCUMENTS

| | | | | |
|---|---|---|---|---|
| 2008/0203052 A1* | 8/2008 | Hossein-Zadeh | ........ | G02B 6/13 216/11 |
| 2011/0044581 A1* | 2/2011 | Grossman | .......... | G02B 6/12007 385/39 |
| 2014/0105232 A1* | 4/2014 | Vahala | ............... | G02B 6/12007 372/9 |

OTHER PUBLICATIONS

Luchansky et al., "High-Q Optical Sensors for Chemical and Biological Analysis," Anal Chem, Jan. 2012, pp. 793-821, vol. 82, No. 2.

* cited by examiner

FULL POLYMER MICRORESONATORS

This application claims priority to German patent Appl. no. 10 2014 012 981.0, filed Sep. 2, 2014, which is incorporated by reference in its entirety.

FIELD

The present invention relates to a microresonator, in particular a full polymer microresonator, a method for the production of the microresonator, and the use of the microresonator as a microlaser and/or molecular sensor.

BACKGROUND

Optical microresonators, using which light can be enclosed in an ultra-small space for a long time, are known in the prior art. These microresonators can be used as microlasers, for example, in particular micro-cup lasers, and are producible in large piece counts and high component density on a chip basis. These structures can be used, inter alia, for the employment as a laser light source in chip-based photonic systems and as a central detection element in the meaning of a biosensor.

Conventional microresonators typically consist of a substrate, a pedestal, and the actual resonator. The resonator, for example, in cup shape, is connected in this case via the pedestal to the substrate, which is typically a silicon wafer and is used as a carrier. The pedestal always consists in this case of the same material as the substrate.

Micro-cup resonators are typically manufactured according to earlier descriptions by a four-step production method. In the first step, a silicon wafer is coated with a polymer photoresist by means of spin coating, wherein the polymer photoresist forms the resonator material. In this polymer, disks having a diameter in the two-figure to three-figure micrometer range are defined in the second step in the meaning of a positive photoresist by means of photolithographic methods. After a suitable (wet) chemical development of the exposed regions, polymer disks on silicon are obtained. In the third step, these disks are isotropically undercut using xenon difluoride ($XeF_2$), so that the edge regions of the polymer disks are exposed and are connected via the pedestal made of silicon to the silicon wafer. Since the edge regions of the polymer disks are exposed, low-loss light guiding is enabled inside the disks. In the final, fourth process step, the entire structure is heated above the glass transition temperature of the polymer. A reduction of disadvantageous surface roughness in the polymer is achieved by this thermal reflow process. Furthermore, the characteristic cup shape of the cup resonators forms as a result of the reduction of the surface energy. The resonator surface is then generally free of defects and enables optical quality factors greater than $10^7$, which are typically limited by intrinsic properties of the polymer.

The preceding production method has disadvantages in particular with regard to the further use of the microresonators for biosensors, however. The use of $XeF_2$ restricts the production method of the microresonators to silicon as the substrate material, whereby the possible uses of the resonators as biosensors are substantially restricted. In this area of application, for example, transparent (for example, for microscopic applications) and/or mechanically flexible substrate materials would be desirable. In addition, the $XeF_2$ etching procedure is a high-vacuum process, which is very time-consuming (infeed and outfeed of the chips, generation of a stable vacuum, etc.) and additionally presumes a costly infrastructure. In addition, even large $XeF_2$ etching facilities are very restricted in their throughput, since the substrates to be etched cannot exceed a specific maximum size.

$XeF_2$ itself is a very costly and highly corrosive chemical. If the optimum vacuum parameters are not precisely maintained during the etching procedure or if atmospheric contaminants and/or residual moisture are present in the etching chamber, interfering organic reaction byproducts form on the resonator surface during the etching procedure. These are disadvantageous in the further use of the microresonators since, for example, subsequent immobilization of the acceptor molecules, which are absolutely required for biosensors, on the resonator surface can no longer be reproducibly applied. Such changes may be directly detected, for example, by way of a change of the water contact angle on the polymer surface.

The etching using $XeF_2$ is therefore not feasible for mass production, which is efficient in time and costs and is reproducible. However, the undercutting of the disks is absolutely necessary for the production of the resonators, since the functionality of the component as an optical element is first enabled in this way. In addition, it is a further disadvantage that it was previously not possible by way of the $XeF_2$ etching procedure to set the pedestal height independently of the pedestal diameter or to create vertical sequences of pedestals and resonators.

SUMMARY

The present invention is therefore based on the object of providing a microresonator, which may be produced via a method without $XeF_2$ etching procedure and is therefore not restricted to silicon in the selection of the substrate material, and also a method for producing this microresonator.

This object is achieved by the embodiments of the present invention characterized in the claims.

In particular, a microresonator is provided according to the invention, comprising, in this sequence, a substrate, an intermediate layer as a pedestal, and a resonator, wherein the intermediate layer comprises an organic or inorganic polymer.

By providing the specific intermediate layer between resonator and substrate material, it is advantageously possible to provide the microresonator according to the invention without an $XeF_2$ etching procedure. By avoiding this etching procedure, it is advantageously possible to also use other materials in addition to silicon, for example, transparent and/or mechanically flexible materials, as the substrate material for the microresonator according to the invention.

Figure 1:
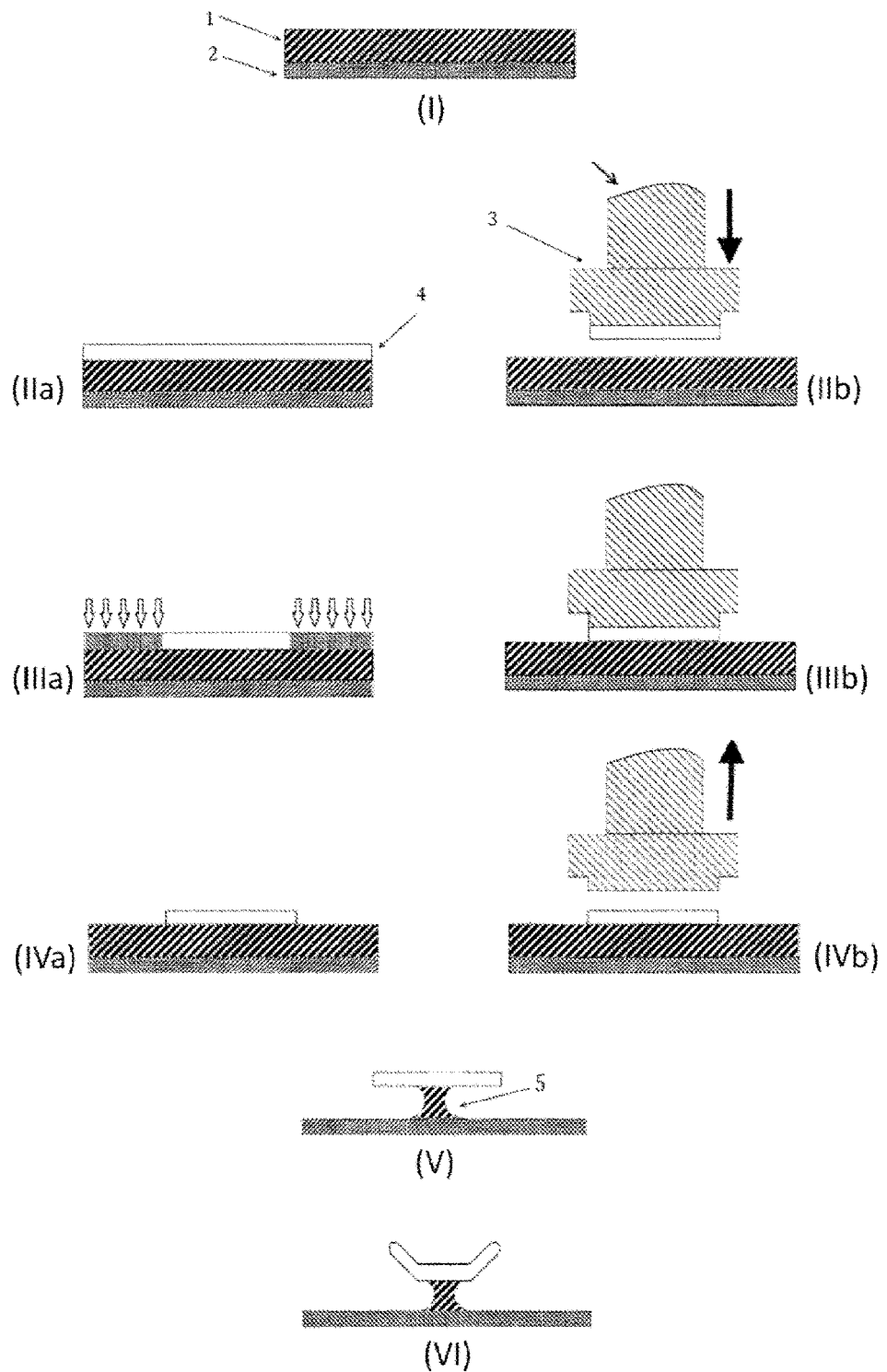
FIG. 1 schematically shows the sequence of the individual method steps in the method according to the invention for producing a microresonator. I. Spin coating of the intermediate layer material; IIa. Spin coating of the resonator material or IIb. Stamp coating; IIIa. Structuring via UV or electron-beam writer or IIIb. Stamp transfer; IVa. Developing the resonator material or IVb. Stamp separation; V. Selective dissolving/etching out of the intermediate layer material; VI. Thermal treatment. Reference numerals 1 refers to an intermediate layer material; 2 refers to a substrate; 3 refers to a stamp; 4 refers to a resonator material; and 5 refers to an isotropically undercut pedestal between resonator and substrate.

The present invention will be explained in greater detail on the basis of the following, nonrestrictive examples.

DETAILED DESCRIPTION

According to the invention, the term "microresonator" is understood as a geometric arrangement in a size range of less than 1 mm, which comprises, in this sequence, a substrate, an intermediate layer as a pedestal, and a resonator. The shape of the resonator is not subject to any special restriction according to the invention. The resonator has, for example, the shape of a cup, a disk (cylinder), a toroid, a sphere, etc., as are known to a person skilled in the art as possible resonator shapes. According to one preferred embodiment, the resonator is in cup shape.

In the microresonator according to the invention, the intermediate layer as the pedestal connects the substrate to the resonator. The intermediate layer comprises an organic or inorganic polymer, which can be isotropically dissolved/etched out by wet chemistry selectively in relation to the other layers, i.e., the substrate and the resonator. According to the invention, the term "polymer" is understood as any organic or inorganic polymer and copolymer and also mixtures of polymers and/or copolymers. Inorganic polymers are, for example, polysilanes, polysiloxanes, polytitanates, polygermanates, polyzirconates, polysulfazenes, polyphosphates, polyphosphazenes, polyboronitrides, etc.

According to one embodiment, the intermediate layer comprises further additives, which can cause increased stability of the layer or further functionalities, for example. Thus, for example, by adding magnetically or electrically conductive particles to the intermediate layer material (pedestal material), the resonator can be electrically contacted and charged particles can be conducted to the resonator by the resulting magnetic field or electrical field. If a polymer or copolymer having functional chemical end groups is used as the intermediate layer material, the pedestal surface can thus advantageously be passivated in a targeted manner, so that molecules can exclusively accumulate on the resonator itself.

The intermediate layer additionally can preferably be processed out of a solution and is compatible in production with the resonator material. This means that the intermediate layer is insensitive in relation to both the solvent and the developer of the resonator material. In addition, the resonator material must adhere sufficiently to the intermediate layer and no disadvantageous chemical reaction can take place between the layers, in particular not even during heating of the entire structure above the glass transition temperature of the resonator material. The intermediate layer preferably has a higher glass transition temperature than the resonator material, since in this way warping or collapsing of the structure of the microresonator according to the invention during heating can be avoided. According to one particularly preferred embodiment, the intermediate layer has a glass transition temperature which is at least 30° C. higher than the resonator material.

According to one preferred embodiment of the present invention, the polymer of the intermediate layer comprises an organic polymer. According to one particularly preferred embodiment of the present invention, the polymer of the intermediate layer is polydimethylglutarimide.

The thickness of the intermediate layer is not subject to any special restriction according to the invention. According to one preferred embodiment, the intermediate layer has a thickness of 1 µm to 1 mm, particularly preferably of 5 µm to 25 µm. In the case of intermediate layer thicknesses less than 1 µm, the distance between the substrate and the light-guiding edge of the resonator becomes so small that undesired coupling of the light out of the resonator into the substrate can occur, whereby the resonator quality can worsen. The diameter of the pedestal is preferably 10% to 80% of the resonator diameter, particularly preferably 33% to 66%, since an ideal cup shape with good stability at the same time is achieved in these ranges in particular in the case of cup-shaped resonators.

In the microresonator according to the invention, the substrate is used as a carrier of the intermediate layer (pedestal layer), on which the resonator is in turn located. The substrate is not subject to any special restriction according to the invention. Since the pedestal in the microresonator according to the invention does not consist of silicon as in the prior art, but rather comprises an organic or inorganic polymer, in the production method of the microresonator according to the invention, the substrate material is advantageously not restricted to silicon, but rather the substrate material can be freely selected, whereby it can have particularly favorable properties with respect to the respective application of the microresonator.

A biocompatible substrate and/or (mechanically) flexible films, which are inexpensive in comparison to silicon wafers, and which can be cut and separated without particle contamination, can advantageously be used as the substrate material. According to the invention, the term "biocompatible" means that components in an analyte, for example, biomolecules, do not degrade upon contact with the substrate, i.e., change their shape and/or functionality, and therefore no longer can be bound by the biofunctionalization of the resonator surface. Biocompatible polymer substrates are, for example, polymethyl methacrylate, polysulfone, cyclo-olefin copolymer, etc. Furthermore, transparent substrates are advantageously possible, which enable optical addressing and readout of the resonator structure through the substrate, as well as already pre-structured substrates. According to the invention, the term "pre-structured substrates" is understood to mean substrates which were already pre-structured in preceding process steps (for example, by means of milling, drilling, photolithography, etching, impression, or vapor deposition) and have a surface topography. Since the substrate itself is not ablated during the etching of the pedestal due to the intermediate layer, a previously produced electrical, micromechanical, microfluidic, or microoptical structure can also be provided on the substrate. The resonators may thus be produced, for example, on microelectronic chips, on microoptical lenses, or in microfluidic channels.

According to one embodiment, the substrate comprises cyclo-olefin copolymers and/or polysulfone. Furthermore, all transparent materials (transparent polymers, glasses, etc.) are advantageous, since they are transparent to excitation and emission light, and (mechanically) flexible materials (for example, polymer films), since the substrate can then be deformed or adapted to any arbitrary surface shape (for example, introduction into microfluidic structures, cannulas, application to other geometries, etc.). Depending on the application, however, metal foils can also be advantageous for applications. "Functional" substrates are particularly advantageous, the optical or mechanical properties of which may be intentionally varied during operation, for example, shape memory materials, the shape of which may be intentionally varied via the temperature, for example. If at least two resonators are structured at a small distance on a shape memory material, the distance between them may be set in a controlled manner, so that optical coupling can be implemented. The coupling properties may be intentionally modified via the distance of the structures.

The thickness of the substrate is not subject to any special restriction according to the invention. The substrate is used as a carrier of the resonators and must therefore ensure the required stability or flexibility. This is dependent on the material and application. According to one preferred embodiment, the substrate has a thickness of 1 µm to 5 mm, particularly preferably 50 µm to 1 mm. For the polymer substrates used, the minimum thickness is to be 50 to 100 µm, for example, since the films could otherwise tear. However, the substrate becomes heavier and more expensive with increasing thickness and, in the case of transparent substrates, the absorption additionally rises. Therefore, the above maximum substrate thickness is not to be exceeded.

The resonator of the microresonator according to the invention is not subject to any special restriction and any material which is known to a person skilled in the art as a suitable material for the production of a resonator of microcup resonators can be used as the resonator material. The resonator can have any arbitrary shape (for example, cup, disk, sphere, toroid). Suitable materials are transparent in the spectral range used, have low optical damping, and have an index of refraction which is greater than that of the ambient medium, to fulfill the requirement for total reflection. Possible materials are, for example, photoresists such as SU-8, ormocere, and/or PMMA-based copolymers. According to one preferred embodiment of the present invention, the material from which the resonator is formed ("resonator material") comprises a polymer or a copolymer. If a polymer or copolymer is used as the resonator material, an expanded functionality can advantageously be introduced into the polymer matrix, for example, in the form of doping with a laser pigment. According to one particularly preferred embodiment, the resonator material comprises polymethyl methacrylate (PMMA), optionally as a copolymer having a 5 to 10 wt.-% fraction of, for example, methacrylic acid or polyglycidyl methacrylate. PMMA advantageously offers, in addition to very good optical properties, low material costs and can be processed at comparatively low temperatures by way of process steps suitable for mass production. In addition, PMMA can be structured on a nanometer scale and can be processed using conventional hot stamping methods.

According to one preferred embodiment of the present invention, the materials of the intermediate layer and the resonator are different from one another, so that in the production method of the microresonator according to the invention, a thermal reflow step is possible as an optional last production step, by which surface defects can be reduced. Resonators having particularly high quality factors may thus advantageously be provided, which can be used in particular in biosensors. If a microresonator is provided, the substrate, intermediate layer, and resonator of which are exclusively formed from polymers and copolymers, this is referred to as a full polymer microresonator.

The thickness of the resonator, i.e., the spatial extension of the resonator from the lower side thereof, which comes into contact with the intermediate layer, up to the upper side of the resonator, is not subject to any special restriction according to the invention. According to one preferred embodiment, the resonator has a thickness of 100 nm to 5 µm, particularly preferably 800 nm to 2 µm. In the case of resonators having a thickness of less than 100 nm, the hazard exists that the resonators will collapse during the undercutting or during the subsequent reflow.

The diameter of the resonator is not subject to any special restriction according to the invention. For example, the resonator has a diameter of 5 µm to 1 mm, preferably 20 µm to 100 µm.

According to one embodiment of the present invention, the microresonator has two or more intermediate layers and two or more resonators, wherein the intermediate layers and resonators are arranged alternately one on top of another, i.e., a vertically stacked sequence of resonators and intermediate layers (intermediate pedestals) is provided. The number of these layer pairs can be from 2 to 10, for example. The above embodiment can thus have vertically coupling resonator structures, which advantageously enable the creation of high-sensitivity biosensors or lasers having a single emission wavelength by way of the Vernier effect. Due to a freely selectable sequence of different polymers or copolymers in such a structure as the light-guiding layers (resonators), which can have different functionalizations in a biosensor experiment, a large number of sensor elements and reference elements may advantageously be implemented extremely compactly and with high component density.

According to one embodiment of the present invention, multiple microresonators according to the invention are arranged on the substrate to form a (large-area) array.

A further aspect of the present invention relates to a method for producing the microresonator according to the invention, comprising the following steps:
(a) providing a substrate;
(b) applying an intermediate layer material to the substrate, wherein the intermediate layer material comprises an organic or inorganic polymer;
(c) applying a disk-shaped resonator to the intermediate layer material; and
(d) selectively dissolving/etching out the intermediate layer material to form a pedestal and to obtain the microresonator.

All above embodiments relating to the microresonator according to the invention also apply to the method according to the invention for producing the microresonator.

In step (a) of the method according to the invention, a substrate is provided, wherein the substrate can advantageously consist of an arbitrary material because of the following method steps. The fabrication parameters of the following method steps are advantageously also substrate-independent, so that adaptation of the production to a given substrate material is omitted.

In step (b) of the method according to the invention, an intermediate layer material is applied to the substrate, wherein the intermediate layer material comprises an organic or inorganic polymer. The intermediate layer material can be applied using any application method known to a person skilled in the art. The thickness of the intermediate layer material, which then later corresponds to the thickness of the intermediate layer as the pedestal, can be freely selected in this case and adapted to the desired later application. According to one embodiment of the present invention, the intermediate layer material is applied by means of spin coating.

In step (c) of the method according to the invention, a disk-shaped resonator is applied to the intermediate layer material. The resonator can be applied using any application method known to a person skilled in the art.

According to one embodiment of the method according to the invention, step (c) comprises the following steps:
(c1) applying a resonator material to the intermediate layer material;
(c2) lithographic structuring of the applied resonator material in disks; and
(c3) developing the lithographically structured resonator material.

In step (c1), a resonator material is applied to the intermediate layer material. The resonator material can be applied using any application method known to a person skilled in the art. According to one embodiment of the present invention, the resonator material is applied in step (c1) by means of spin coating.

In step (c2), the applied resonator material is lithographically structured in disks. The resonator material can be structured using any lithographic method known to a person skilled in the art. According to one embodiment, the resonator material is structured by means of electron beam lithography. According to an alternative embodiment, the resonator material is structured by DUV lithography, whereby large piece counts of resonators may advantageously be manufactured in a parallel production method.

In step (c3), the lithographically structured resonator material is developed. The development is performed in this case by methods known to a person skilled in the art, for example, by a wet-chemical process step.

According to an alternative embodiment, step (c) comprises step (c4), stamp transfer of the resonator to the intermediate layer material. In this case, the resonator is applied by means of a stamp to the intermediate layer material already in disk form, so that a subsequent developing step like above-described step (c3) can be omitted. In particular for industrial production of large piece counts, a stamp transfer method is very advantageous, since it enables very large-area and cost-effective production. For the transfer, for example, a stamp is used, on the surface of which protrusions in the form of the resonators are applied. The surface energy of the stamp can be reduced by an anti-adhesive coating, for example, made of perfluorinated polymers such as Teflon, so that the resonator material deposited thereon only adheres slightly to the stamp surface. If the stamp is brought into contact with a substrate having higher surface energy, the resonator material on the protruding stamp surfaces is then transferred to the substrate. Disk-shaped resonators are thus advantageously obtained on the substrate without lithographic structuring and development. The subsequent processing of the intermediate layer and optional reflow process can remain unchanged.

In step (d) of the method according to the invention, the intermediate layer material is selectively dissolved/etched out to form a pedestal. This step is preferably performed as wet chemical isotropic etching, during which the resonator material is partially undercut, so that the remaining intermediate layer subsequently forms the pedestal between substrate and resonator. The etching in step (d) is carried out such that at least the edge of the resonator disk is exposed, so that the optical modes in the resonator which extend along the outer edge do not interact with the pedestal and are not damped thereby. Step (d) is not subject to any further restriction and the required method parameters (etching chemicals, etching duration, etc.) for wet chemical etching are known to a person skilled in the art depending on the intermediate layer material used.

According to one embodiment, the method further comprises step (e), thermal treatment of the microresonator obtained in steps (a) to (d) to reduce surface defects. In addition, a micro-cup resonator with reduced surface defects can be obtained according to one embodiment by optional step (e).

In optional step (e) of the method, the manufactured/resulting structure in steps (a) to (d) is thermally treated to achieve a reduction of disadvantageous surface roughness. Furthermore, according to one embodiment of the present invention, the characteristic cup shape of the resonators forms as a result of the reduction of the surface energy.

According to one embodiment, the thermal treatment is carried out for a duration of 1 second to 1 hour, preferably 5 seconds to 1 minute. With an excessively short duration, the risk exists that the time will not be sufficient for uniform heating of the substrate and the reflow process will not be started or will not be completely finished. With an excessively long duration, the risk exists that potentially present, temperature-sensitive laser pigments in the resonator material and/or the chemical end groups of optionally used functional copolymers for surface functionalization can degrade. The thermal treatment is preferably carried out at temperatures of 110° C. to 180° C., particularly preferably 125 to 140° C. According to one preferred embodiment, the temperature is approximately 10 to 30° C. above the glass transition temperature of the resonator material. If PMMA is used as the resonator material, for example (glass transition temperature approximately 110° C.), the reflow is thus preferably performed at 125 to 140° C. For copolymers having a higher or lower glass transition temperature, the reflow temperature has to be increased or decreased accordingly. The reflow temperature should thus tend to be approximately 10 to 30° C. above the glass transition temperature. According to the invention, the above temperature for the thermal treatment is defined as the temperature which the heating plate or the furnace has, on which/in which the substrate is heated.

FIG. 1 schematically shows the sequence of the individual method steps in the method according to the invention for producing a microresonator according to the invention, wherein the above-described variants of step (c) are shown (I. Spin coating of the intermediate layer material; IIa. Spin coating of the resonator material or IIb. Stamp coating; IIIa. Structuring via UV or electron-beam writer or IIIb. Stamp transfer; IVa. Developing the resonator material or IVb. Stamp separation; V. Selective dissolving/etching out of the intermediate layer material; VI. Thermal treatment).

Figure 2:
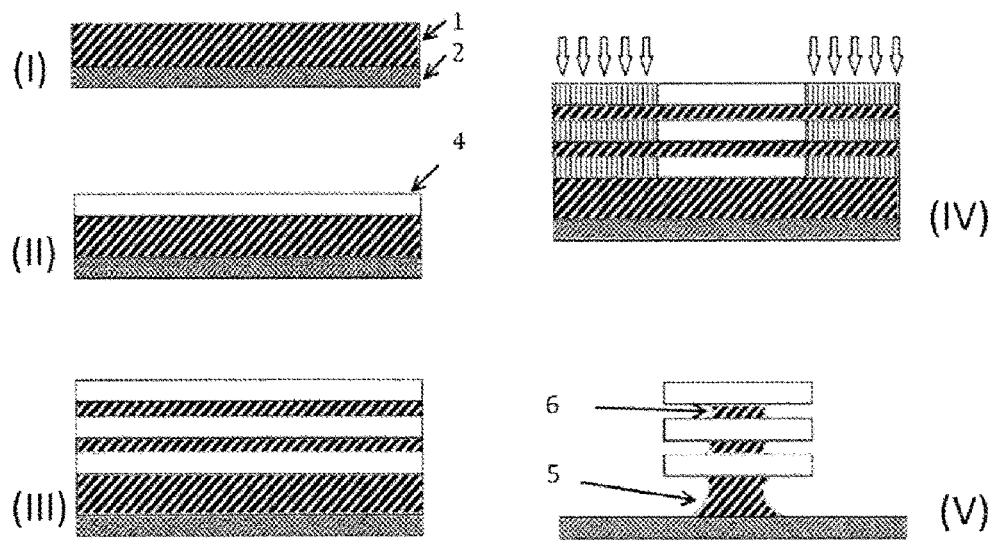
FIG. 2 schematically shows the sequence of the individual method steps in the method according to the invention for producing a sequence of microresonators having vertically stacked layers. I. Spin coating of the intermediate layer material; II. Spin coating of the resonator material; III. Repeated spin coating of intermediate layer material and resonator material; IV. Structuring via UV or electron-beam writer; V. Selective dissolving/etching out of the intermediate layer material. Reference numerals 1 refers to an intermediate layer material; 2 refers to a substrate; 3 refers to a stamp; 4 refers to a resonator material; 5 refers to an isotropically undercut pedestal between resonator and substrate; and 6 refers to an isotropically etched pedestal between two light-guiding layers.

According to one embodiment of the method according to the invention, steps (b) and (c) are carried out multiple times alternately in succession. In this way, a sequence of microresonators can advantageously be provided, which has two or more intermediate layers and two or more resonators. If step (c) of the method according to the invention comprises steps (c1), (c2), and (c3), step (c3) is thus preferably only carried out when all intermediate layers and resonator layers have been applied. FIG. 2 schematically shows the sequence of the individual method steps in the method according to the invention for producing a sequence of microresonators having vertically stacked layers (I. Spin coating of the intermediate layer material; II. Spin coating of the resonator material; III. Repeated spin coating of intermediate layer material and resonator material; IV. Structuring via UV or electron-beam writer; V. Selective dissolving/etching out of the intermediate layer material).

The chemical functionality of the resonator surface can be reproducibly ensured by wet chemical step (d) of the method according to the invention. This is absolutely necessary for a use of the microresonator of the present invention as a biosensor, which presumes a subsequent chemical functionalization of the resonator surface. Furthermore, flexible and very well reproducible monitoring of the pedestal height or the pedestal diameter is possible by way of the method according to the invention, in particular since pedestal height and diameter are variably adjustable independently of one another. Height and diameter of the pedestal can advantageously be adjusted by monitoring the applied intermediate layer or the duration of the wet chemical undercutting. This is essential in particular for the integration of the microresonator in a lab-on-a-chip environment and was not achievable by the previously known method using $XeF_2$ etching procedure, in which pedestal height and diameter are not variable independently of one another.

A further aspect of the present invention relates to the use of the microresonator according to the invention or the microresonator or the array made of microresonators according to the invention, which is produced via the method according to the invention, as a microlaser and/or molecular sensor. Thus, the microresonator according to the invention can be used, for example, in the analysis of blood serum or plasma, urine, saliva, and/or other bodily fluids for diagnosing illness. Because of its cost-effective mode of production, the microresonator according to the invention is particularly suitable for this purpose, since applications in biosensors preferably require analysis chips, which are to be used as disposable components because of possible contamination during the analysis or for hygienic reasons.

In the present invention, by introducing an intermediate layer as a pedestal between resonator and substrate, an $XeF_2$ etching procedure is advantageously omitted and for the first time the pedestal required for the light-guiding resonator is implemented via a wet chemical method. The method according to the invention therefore represents, on the one hand, a significant simplification of the production process and additionally also enables microresonators to be provided, in which the substrate material can be freely selected and individually adapted to the respective desired application. It is thus advantageously possible in the microresonator according to the invention to use, for example, transparent and/or mechanically flexible materials and/or pre-structured substrates. In addition, vertically stacked resonator layers having a variable layer sequence in adjustable distances between the layers can advantageously be provided, which may then have different biofunctionalizations in a layer-selective manner upon the use of different polymers and/or copolymers.

By avoiding the $XeF_2$ etching procedure, the method according to the invention does not require any process steps in high vacuum, in contrast to the previously known methods. The simplification of the production method which advantageously accompanies this results in independence of the method from any type of the substrate, the substrate size, and the substrate shape. In addition, the use and occurrence of highly toxic chemicals is avoided and the expenditure in time and apparatus for the production is significantly reduced.

The method according to the invention advantageously enables large-scale industrial production and, in particular if a flexible substrate material is used, manufacturing of the structures using established printing methods, for example, UV nanoimprinting, roll-to-roll production processes (UV assisted and non-UV assisted, vapor deposition, use of the roll as an impression tool, use of a second foil as an impression tool, etc.), stamp transfer techniques (for example, microcontact printing), and impression processes, for example, hot stamping, replica molding, microtransfer molding, capillary micromolding, etc.

Because of the above advantages and special features of the microresonator according to the invention and the method according to the invention for producing these microresonators, the microresonators of the present invention are advantageously outstandingly usable in particular for detecting ultrasmall virus and particle concentrations down to detecting individual molecules in a variety of applications in medicine, pharmacology, biology, and chemistry.

Production Example 1

The commercially available polymer LOR 30B (Microchem) based on polydimethylglutarimide was applied by means of spin coating as the intermediate layer material in a layer thickness of 5 µm onto a silicon wafer as the substrate. The structure was subsequently temperature treated for 5 to 30 minutes at 180° C. To prevent bubbling, the temperature was continuously increased within 5 to 90 minutes from room temperature to 180° C. A 1.2 µm thick layer of PMMA 950k (Microchem) was then applied to the intermediate layer material by means of spin coating as the resonator material and the structure was temperature treated during a heating duration of 5 minutes at 110° C. Electron beam lithography was used for the lithographic structuring of disks having 50 µm diameter in the PMMA layer (resonator material). The exposed PMMA was selectively developed using a mixture of methyl isobutylketone and isopropanol (mixture ratio 1:1). A developer based on tetramethyl ammonium hydroxide (101 A developer from Microchem) was used for the selective etching of the LOR layer (intermediate layer material). The etching duration was set so that the PMMA disks were undercut by half, i.e., between 30 and 60 minutes. Subsequently, the structure obtained was heated on a heating plate for 30 seconds to 130° C. for the thermal reflow of the resonators. The cup shape of the resonators resulted in this case.

Figure 3:
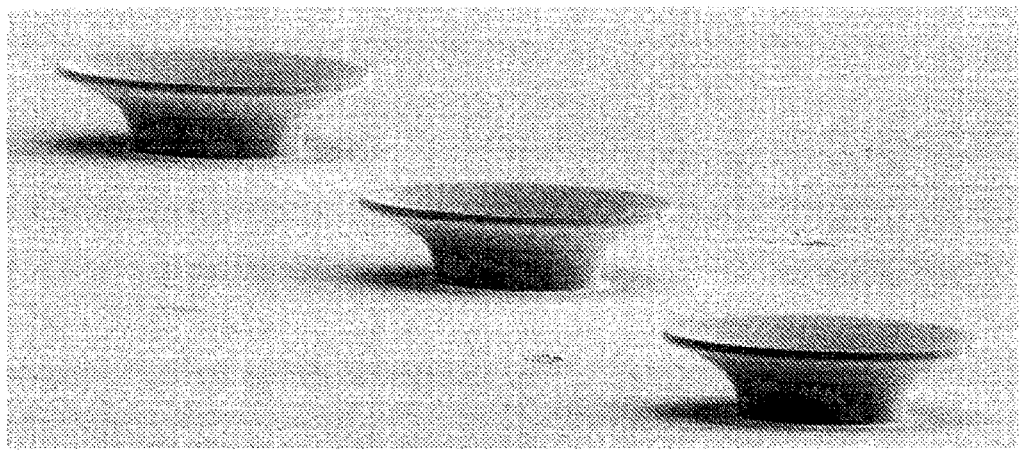
FIG. 3 shows a scanning electron microscope picture of an array made of three micro-cup resonators according to the invention.

FIG. 3 shows three micro-cup resonators produced in this manner. The cup shape is very homogeneous because of the thermal reflow process and the pedestal diameter of the micro-cup resonators is adjustable in a controlled manner.

Production Examples 2 and 3

Micro-cup resonators were produced similarly to production example 1, wherein instead of the silicon wafer, polymer films having 200 to 350 µm thickness made of cyclo-olefin copolymer (COC; production example 2) and polysulfone (PSU; production example 3) were used as the substrates. Except for a slight increase of the reflow temperature from 130° C. to 135° C. because of the lower thermal conductivity of the substrate materials used, identical method parameters were used as in production example 1.

Micro-cup resonators were able to be produced successfully using both substrate materials. This shows clearly that the production method according to the invention is independent of the substrate material used.

Production Example 4

To produce stacked resonators, the first two steps of production example 1, i.e., the spin coating of LOR resist and PMMA, were repeated multiple times in succession. Subsequently, the photosensitive resist was exposed in one step and the entire structure was created by a sequence of development steps.

Test Example 1

The optical properties of the cup resonators were characterized at a measuring station for laser characteristic curves. For this purpose, the laser pigment pyrromethene 597 was admixed to the PMMA before the production of the micro-cup resonators, so that the cups function as microlasers.

Figure 4:
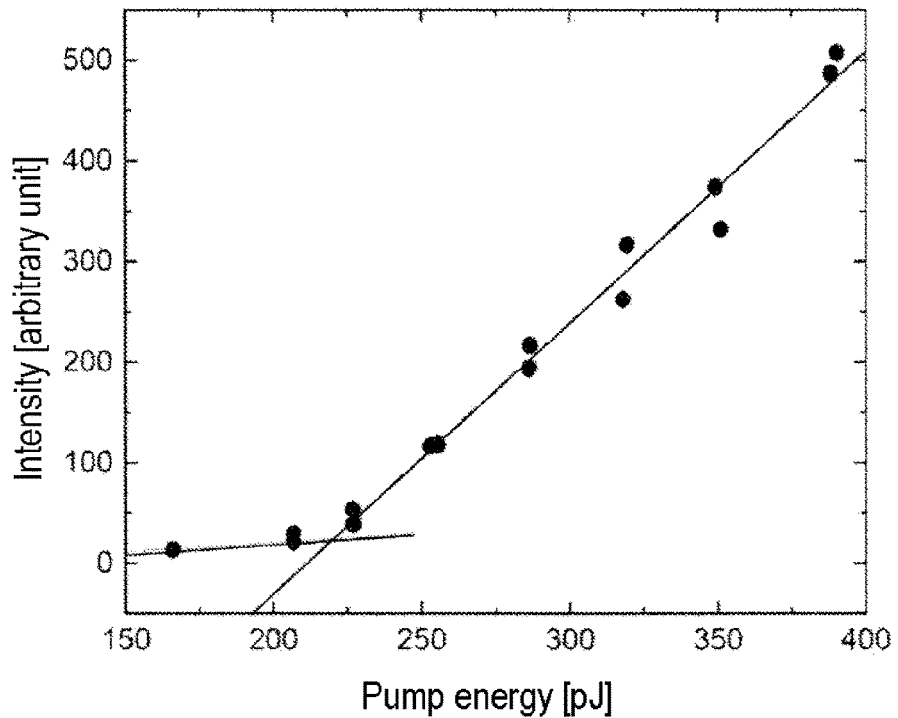
FIG. 4 shows the laser characteristic curve of a pigment-doped micro-cup laser according to the invention on a pedestal made of polymer.
Figure 5:
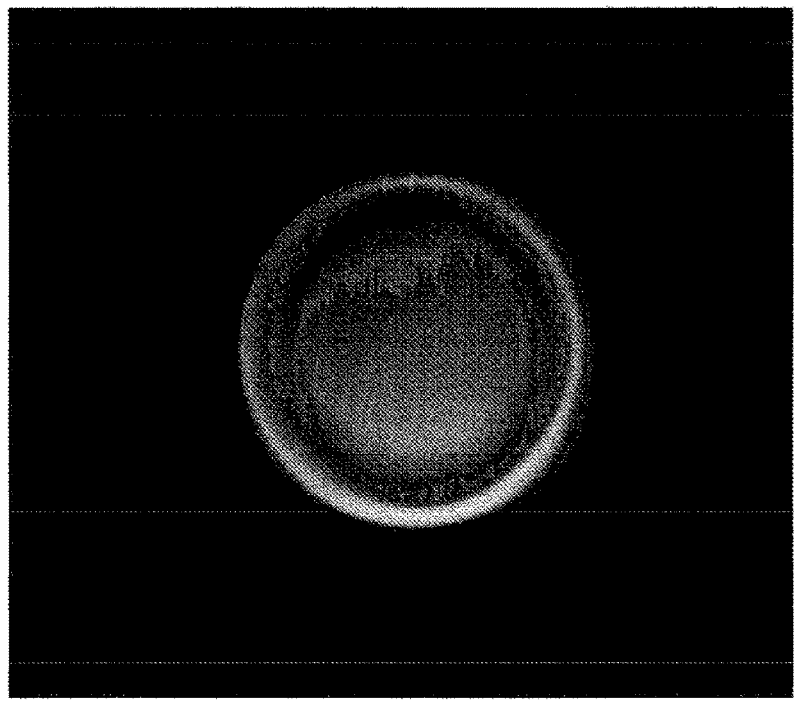
FIG. 5 shows a light microscope picture of a micro-cup laser according to the invention during the optical excitation by means of pump laser.

FIGS. 4 and 5 show the laser characteristic curve of a resonator on a pedestal (intermediate layer) made of liftoff resist 30B (Microchem), which is based on polydimethylglutarimide, and a light microscope picture of the micro-cup laser during the optical excitation by means of pump laser. The laser threshold is approximately 220 pJ per application pulse and is therefore in the same range as the laser threshold of cup lasers on a silicon pedestal. The production of micro-cup resonators on polymer pedestals therefore does not influence the optical quality of the resonators.

Test Example 2

The cup lasers of production examples 2 and 3, which were produced on the polymer substrates made of PSU and COC, could be optically pumped and read out successively through the transparent substrate. This advantageously enables the optical addressing to be performed at a separate location from the fluidic addressing for applications in biosensors. Thus, for example, the fluidic supply of the analyte can be performed on the chip front side, while the optical addressing is performed from the chip rear side.

The invention claimed is:

1. A microresonator, comprising, in this sequence, a substrate, an intermediate layer as a pedestal, and a resonator,
   wherein the intermediate layer comprises an organic or inorganic polymer,
   wherein the resonator material comprises a polymer or a copolymer,
   wherein the material of the substrate is different from the material of the intermediate layer, and
   wherein the materials of the intermediate layer and the resonator material are different from each other.

2. The microresonator as claimed in claim 1, wherein the glass transition temperature of the polymer is greater than that of the material of the resonator.

3. The microresonator as claimed in claim 1, wherein the polymer is polydimethylglutarimide.

4. The microresonator as claimed in claim 1, wherein the intermediate layer has a thickness of 1 µm to 1 mm.

5. The microresonator as claimed in claim 1, wherein the substrate has at least one characteristic selected from transparency, biocompatibility and mechanical flexibility.

6. The microresonator as claimed in claim 1, wherein the substrate comprises at least one of cyclo-olefin copolymers, polysulfone and a glass.

7. The microresonator as claimed in claim 1, wherein the microresonator has two or more intermediate layers and two or more resonators, wherein the intermediate layers and resonators are arranged alternately one on top of another.

8. A method for producing a microresonator as claimed in claim 1, comprising the following steps:
   (a) providing a substrate;
   (b) applying an intermediate layer material to the substrate, wherein the intermediate layer material comprises an organic or inorganic polymer;
   (c) applying a disk-shaped resonator to the intermediate layer material, wherein the resonator material comprises a polymer or a copolymer; and
   (d) selectively dissolving and/or etching out the intermediate layer material to form a pedestal and to obtain the microresonator,
   wherein the material of the substrate is different from the material of the intermediate layer, and
   wherein the materials of the intermediate layer and the resonator material are different from each other.

9. The method as claimed in claim 8, further comprising step (e) of thermally treating the microresonator obtained in steps (a) to (d) to reduce surface defects.

10. The method as claimed in claim 8, wherein steps (b) and (c) are carried out multiple times alternately in succession.

11. The method as claimed in claim 8, wherein step (c) comprises the following steps:
    (c1) applying a resonator material to the intermediate layer material;
    (c2) lithographic structuring of the applied resonator material in disks; and
    (c3) developing the lithographically structured resonator material.

12. The method as claimed in claim 8, wherein step (c) comprises the following step:
    (c4) stamp transfer of the resonator to the intermediate layer material.

13. A microlaser and/or molecular sensor comprising the microresonator of claim 1.

* * * * *